F. E. SMALL.
MEASURING DEVICE.
APPLICATION FILED SEPT. 25, 1920.
1,425,800. Patented Aug. 15, 1922.
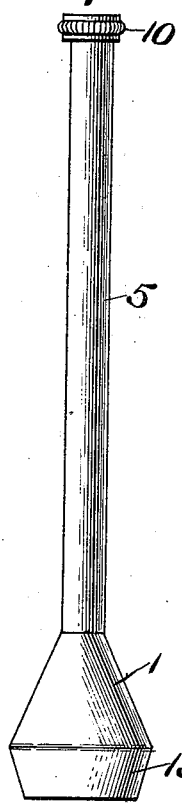
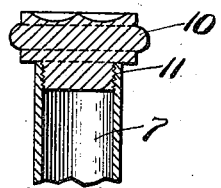
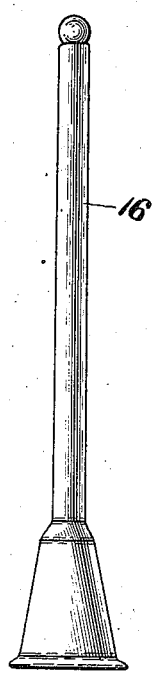
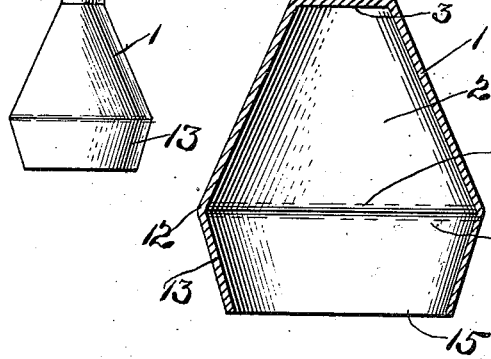
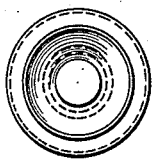
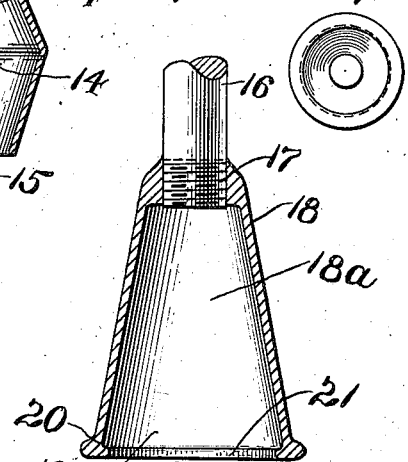
Inventor:
Frank E. Small
by Roberts, Roberts & Cushman
Attys.

UNITED STATES PATENT OFFICE.

FRANK E. SMALL, OF JAMAICA, LONG ISLAND, NEW YORK.

MEASURING DEVICE.

1,425,800.          Specification of Letters Patent.     Patented Aug. 15, 1922.

Application filed September 25, 1920. Serial No. 412,854.

*To all whom it may concern:*

Be it known that I, FRANK E. SMALL, a citizen of the United States, and resident of Jamaica, Long Island, in the county of Queens and State of New York, have invented new and useful Improvements in Measuring Devices, of which the following is a specification.

This invention relates to measuring devices and more particularly to that type of such a device as comprises an open ended vessel which is filled by plunging the same with its open end downwardly into a mass of the material from which a measured quantity is to be withdrawn.

While the device of the present invention in certain of its aspects may be of general utility in the measuring of finely divided dry materials, it is more specifically intended for measuring small quantities of granular material, such for example, as granulated sugar, and is herein shown as embodied in a form particularly adapted for culinary and table use.

In the preparation of foods for domestic use, it is quite commonly necessary to measure granulated sugar in amounts corresponding to a teaspoonful or a half teaspoonful, but such measurements, when carried out with the ordinary teaspoon are frequently inaccurate, varying very widely from the prescribed amount and thus serving in many cases to deleteriously affect the quality of the food in course of preparation.

When the ordinary teaspoon is employed at the table for conveying sugar from the sugar bowl or other receptacles to the cup of the user, much wastage of sugar is frequently caused by the spilling of the sugar from the sides of the heaped spoon while furthermore the similarly of the utensil employed for measuring the sugar and conveying it to the cup to that employed for stirring the liquid into which the sugar is placed is a frequent cause of the accidental wetting of the sugar measuring device by such liquid, thus making it undesirable to return the same to the sugar bowl.

The object of the present invention is to provide a sugar measuring device so constructed that it requires little or no care on the part of the user to obtain accurate measurements therewith, while at the same time providing a utensil desirable for table use, whereby sugar may be conveyed from the sugar bowl to the cup or other point of use with little probability of spilling or waste, while at the same time embodying such device in a form so different from that of the ordinary teaspoon as to preclude any probability of its being used as a stirring implement.

In a device of this kind, it is essential that the material being measured may be readily discharged from the measuring device when brought to the point of use, and a further object of the invention is to provide such a measuring device from which the material may be quickly discharged without substantial effort on the part of the operator. To this end the measuring device may be provided with means for imparting thereto a blow sufficient to jar the material in the measuring receptacle sufficiently to cause its free discharge.

One mode of carrying into effect the above objects is disclosed in the accompanying drawings, in which—

Fig. 1 is a front elevation illustrating the device in its preferred form.

Fig. 2 is a central vertical section of the device of Fig. 1, but to larger scale.

Fig. 3 is a bottom plan view of the device shown in Fig. 1.

Fig. 4 is a view similar to Fig. 1, but illustrating a modification of the device.

Fig. 5 is a fragmentary vertical sectional view to enlarged scale of the lower part of the device shown in Fig. 4, and Fig. 6 is a bottom plan view of the device shown in Fig. 4.

1 is a vessel of conical form and which may if desired, be of sheet metal or other suitable material, such vessel providing at its interior a conical cavity 2, the upper end 3 of which is closed and the lower and larger end 4 of which is open.

A handle 5 is secured to the small end of the vessel 1 in any suitable manner as by screw-threaded engagement therewith as indicated at 6. The handle 5 in its preferred form comprises an elongated tube providing an interior chamber 7, such tube with the chamber 7 being substantially coaxial with the conical vessel 1.

Within the chamber 7 is a freely slidable weight, herein illustrated as taking the form of a ball 8, and to prevent the ready escape of such ball from the lower end of the chamber, the walls of the tube may be bent inwardly at the lower end as indicated at 9. This arrangement is not essential, but is convenient to prevent the escape of the ball from the handle before the attaching of the vessel 1 thereto.

For retaining the ball 8 within the chamber 7 and for imparting a suitable finish to the upper end of the handle, a cap 10 is provided, such cap preferably having screw-threaded engagement at 11 with the interior wall of the tube. If desired, however, the cap 10 may be integral with the handle member 5 and after the insertion of the ball 8 within the cavity 7, the walls of the tube may be flanged inwardly as previously described at 9 to retain the ball in place.

The lower edge of the vessel 1 is indicated at 12 and to such edge is secured the larger end of a truncated conical ring or flange 13. Such flange may, if desired, be integral with the vessel 1, as herein illustrated, or secured thereto in any desired manner. In either case such ring is arranged coaxially with the vessel 1. The upper end 14 of the ring 13 is of substantially the same internal diameter as the lower end 4 of the vessel 1, but the lower end 15 of said ring 13 is of smaller diameter and is open.

The device shown in Figs. 1 to 3 inclusive is a preferred form and as shown in Fig. 1 is of a size adapted for the measuring of granulated material in quantities substantially equivalent to a teaspoonful.

In Figs. 4, 5 and 6 is illustrated a modified form of the device and which is particularly adapted for measuring quantities somewhat smaller than that shown in the device in Fig. 1 and of the order of a half teaspoonful.

16 is a handle member which may consist of a solid rod if desired, although a hollow handle provided with a ball or other suitable weight such as illustrated in Fig. 2 may be substituted therefor if desired. The handle 16 at its lower end has screw-threaded engagement at 17 with the upper smaller end of a conical vessel 18 having an interior conical cavity 18ᵃ. The lower larger end of the vessel 18 is open as indicated at 19. Extending inwardly from the lower edge 20 of the vessel 18 is a radial flange 21, such flange serving to restrict the area of the opening 19 to a certain extent, and in this respect having the same function as the ring 13 described in connection with the preferred form of the device.

In the use of the device forming the subject matter of this invention, the user, taking the implement by its handle, will plunge the open end thereof downwardly into a mass of material from which it is desired to remove a measured quantity. Such material flows upwardly into the interior of the implement completely filling the cavity therein, the force of the thrust imparted to the implement serving to jam or wedge the material within the cavity. This wedging action is supplemented by the provision of the aforesaid means for restricting the open end of the vessel, the flanges 13 or 21 serving in a very efficient manner to obstruct the free outward flow of the material after the filling of the cavity therewith under pressure.

In the device as illustrated in Fig. 2, the user, after filling the implement, will naturally withdraw the same from the mass and invert the device to a certain extent while carrying the material to the point of use. Such inversion, if sufficient, will cause the ball 8 to roll toward the end 10 of the handle, possibly striking the latter a slight blow, thus tending to jar the material held in the cavity 2 and to loosen the same, whereby its discharge from the cavity is facilitated. Upon reversal of the device for discharging the material from the cavity, the ball will drop to the position shown in Fig. 2 imparting a still further jar to the implement, thus causing the material held therein to flow freely therefrom. If instead of reversing the implement, the operator chooses to carry the same with its load of material to the point of use while holding it in the position shown in Fig. 1, the material may be caused to flow therefrom by giving the device a quick upward and downward motion, whereby the ball 8 is caused to jump upwardly within the cavity and then to fall, thus imparting the necessary shock for loosening the material.

The device shown in Fig. 4 is used in the same manner, but when a solid handle is employed as therein illustrated, the operator may cause discharge of the material therefrom by striking the vessel lightly against the side of the container into which it is desired to discharge the material held in the vessel. One or two light blows are usually sufficient to cause the material to flow freely from the vessel.

While the device has been disclosed as particularly adapted for measuring quantities such as teaspoonfuls and half teaspoonfuls, it is evident that it might be made in varying capacities in accordance with the quantities of the material which it is desired to measure. Furthermore, although intended primarily for the measuring of granular materials such as sugar, it is clear that such a device may find utility in the measuring of various comminuted materials, particularly in the dry form.

The device as illustrated in the drawings has been shown as comprising a vessel having both its interior and exterior of substantially conical form, but it is to be understood that the exterior form of the device is of no particular importance in so far as its function is concerned, and that various changes in the specific form and shape of the device may be made without departing from the spirit of the invention.

Having now described the invention in a preferred embodiment thereof, together with the mode of use of the same, what I claim and desire to secure by Letters Patent of the United States is:

1. An implement for measuring granular material comprising a handle and a vessel mounted thereon, said vessel having its lower end open and providing a chamber whose inner wall flares outwardly toward the open end thereof, and means for opposing free discharge of material from the lower open end of said vessel.

2. A device for lifting predetermined quantities of granular material from a mass thereof comprising a handle, a vessel of substantially conical form having its smaller end secured to said handle, said vessel providing an outwardly flaring, downwardly opening chamber, and means for restricting the area of the opening into such chamber.

3. A measuring device of the class described comprising a vessel of substantially conical form having the smaller end thereof closed and the larger end open, and a circumferential flange surrounding the open end of said vessel, said flange being of substantially uniform width and concentric with said open end, the inner surface of said flange being inclined inwardly toward the axis of said vessel.

4. A device for measuring granular material comprising an elongated supporting member, a substantially conical vessel having its smaller end secured to the extremity of said vessel, said vessel providing a chamber having outwardly divergent inner walls and an open end, and a circumferentially extending, inwardly directed element carried by said vessel for restricting the area of the open end of said chamber.

5. A conical measuring cup for granular material having a handle secured to the smaller end thereof, the larger end of said cup being open, and being constructed and arranged to be plunged downwardly into a mass of material in filling the cup, and a circumferential flange member constructed and arranged to restrict the area of the opening at such larger end.

6. A measuring cup comprising a member of substantially conical form having the larger end thereof open, and constructed and arranged to have such larger end directed downwardly while in use, and another member of frusto-conical form having its edge at its larger end united to the edge of said conical member at the larger end thereof, and having its smaller end open.

7. A measuring device for measuring granular material comprising a vessel of conical form having a handle secured to the smaller end thereof and extending co-axially therewith, and a frusto-conical ring having its edge at its larger end united to the edge of said vessel at the larger end thereof, the smaller end of said ring being open.

8. A measuring device comprising an open ended vessel constructed and arranged to be filled by plunging the open end thereof downwardly into a mass of granular material, and impact means associated with said vessel for facilitating the discharge of such granular material therefrom.

9. A measuring device comprising an open ended vessel of conical form constructed and arranged to be filled with comminuted material by plunging the open end thereof downwardly into a mass of such material, a handle for said vessel, and a weight slidably guided by said handle, said weight serving to facilitate discharge of the material from said vessel by imparting vibration of impact thereto.

10. A device for measuring granular material comprising an open ended cup constructed and arranged to be filled with such material by plunging the open end of said cup downwardly into a mass thereof, a hollow elongated handle secured to the closed end of said cup, and a ball freely slidable within said handle, said ball by impact with the ends of said handle serving to jar the material within said cup to facilitate the discharge thereof.

11. A measuring device for measuring dry granular material comprising a vessel of conical form having a handle secured to the smaller end thereof and extending co-axially therewith, said handle having an elongated, axial chamber therein, a weight freely slidable in said chamber, and a frusto-conical ring co-axially arranged relatively to said conical vessel and with its larger end abutting the larger end of the latter, the smaller end of said ring being open.

Signed by me at Jamaica, Queens Co., N. Y., this 22 day of September, 1920.

FRANK E. SMALL.